(12) United States Patent
Smit

(10) Patent No.: US 10,198,029 B2
(45) Date of Patent: Feb. 5, 2019

(54) WEARABLE COMPUTER CASE AND WEARABLE COMPUTER

(71) Applicant: Smolding BV, Waalre (NL)

(72) Inventor: Raymond Maurice Smit, Waalre (NL)

(73) Assignee: Smolding BV, Waalre (NL)

( * ) Notice: Subject to any disclaimer, the term of this patent is extended or adjusted under 35 U.S.C. 154(b) by 0 days.

(21) Appl. No.: 15/803,566

(22) Filed: Nov. 3, 2017

(65) Prior Publication Data
US 2018/0120897 A1    May 3, 2018

Related U.S. Application Data

(63) Continuation-in-part of application No. 29/583,304, filed on Nov. 3, 2016, now Pat. No. Des. 803,212.

(60) Provisional application No. 62/416,906, filed on Nov. 3, 2016.

(51) Int. Cl.
*G06F 1/16*    (2006.01)
*A45F 3/04*    (2006.01)

(52) U.S. Cl.
CPC ............ *G06F 1/1628* (2013.01); *A45F 3/047* (2013.01); *G06F 1/163* (2013.01); *A45F 2200/0525* (2013.01)

(58) Field of Classification Search
CPC combination set(s) only.
See application file for complete search history.

(56) References Cited

U.S. PATENT DOCUMENTS

| | | |
|---|---|---|
| 4,462,525 A | 7/1984 | Pingleton |
| 5,285,398 A | 2/1994 | Janik |
| 5,305,244 A | 4/1994 | Newman |
| 5,491,651 A | 2/1996 | Janik |
| 5,509,279 A | 4/1996 | Brown |

(Continued)

FOREIGN PATENT DOCUMENTS

WO    WO2007133209 A1    11/2007

OTHER PUBLICATIONS

MSI VR PC backpack Published on May 31, 2016 https://arstechnica.com/gadgets/2016/05/msi-hp-zotac-backpack-vr-pc-details-specs-price-release-date/ See NPL submission filed concurrently.

(Continued)

*Primary Examiner* — Lisa Lea Edmonds
(74) *Attorney, Agent, or Firm* — Eric Kelly

(57) ABSTRACT

An externally rigid to semi-rigid wearable computer case for housing various computer components may include two different types of external sides: ventilated-sides and a non-ventilated side. In some embodiments, the wearable computer case may have four to five ventilated-sides. The ventilated-sides and the non-ventilated side together may form an enclosure for housing the various computer components. The ventilated-sides may include ventilation-holes. The ventilation-holes in a given ventilated-side may provide for a ratio of void space to non-void space (in terms of external surface area) that may be substantially from and including 0.6 to 0.4. Some embodiments may also provide for hot swap battery pack(s) that may be external to the wearable computer case and that may provide at least some electrical power to the various computer components housed within the wearable computer case. The wearable computer case and/or the hot swap battery pack(s) may be for VR/AR/MR use.

20 Claims, 9 Drawing Sheets

(56) References Cited

U.S. PATENT DOCUMENTS

| | | | |
|---|---|---|---|
| 5,844,824 A | 12/1998 | Newman | |
| 5,911,348 A | 6/1999 | Shook | |
| 6,249,427 B1 | 6/2001 | Carroll | |
| 6,325,262 B1 | 12/2001 | Thompson | |
| D455,746 S | 4/2002 | Ronzani | |
| 6,529,372 B1 | 3/2003 | Ng | |
| 6,538,623 B1 | 3/2003 | Parnian | |
| 6,552,899 B2* | 4/2003 | Ronzani | G06F 1/163 361/679.54 |
| 6,662,985 B2* | 12/2003 | Harada | A45F 5/02 224/661 |
| D496,049 S * | 9/2004 | Heinz | D14/444 |
| 6,843,012 B1 | 1/2005 | Dodd | |
| D502,176 S | 2/2005 | Furnagalli | |
| D520,016 S | 5/2006 | Lin | |
| 7,265,970 B2 | 9/2007 | Jordan | |
| 7,542,275 B2 | 6/2009 | Sun | |
| 7,965,499 B2 | 6/2011 | Du | |
| 7,978,464 B2 | 7/2011 | Daley | |
| 8,074,853 B1 | 12/2011 | Hirshberg | |
| 8,292,678 B2* | 10/2012 | Burgess, Jr. | A63C 17/0013 180/180 |
| 8,400,768 B2* | 3/2013 | Baitz | G06F 1/181 361/679.02 |
| 8,491,066 B2 | 7/2013 | Chang | |
| 9,264,088 B2 | 2/2016 | Wojcik | |
| 2002/0074199 A1 | 6/2002 | Albritton | |
| 2006/0113203 A1 | 6/2006 | Daley | |
| 2007/0201201 A1 | 8/2007 | Daley | |
| 2009/0141446 A1 | 6/2009 | Daley | |
| 2009/0284908 A1 | 11/2009 | Daley | |
| 2015/0116316 A1 | 4/2015 | Fitzgerald | |
| 2016/0119013 A1 | 4/2016 | Wojcik | |
| 2016/0163283 A1 | 6/2016 | Chang | |
| 2018/0092455 A1* | 4/2018 | Kim | A45F 3/047 |

OTHER PUBLICATIONS

Alienware VR PC backpack Published at least as early as Aug. 9, 2016 https://www.roadtovr.com/alienware-backpack-pc-virtual-reality-e3-2016/ See NPL submission filed concurrently.

Omen VR PC backpack Published May 27, 2016 https://www.slashgear.com/the-omen-x-vr-pc-pack-is-an-hp-vr-backpack-project-for-htc-vive-27441893/ See NPL submission filed concurrently.

Zotac VR PC backpack Published at least as early as Aug. 9, 2016 https://allgamers.com/article/2147/vr-backpack-from-concept-to-virtual-reality See NPL submission filed concurrently.

* cited by examiner

WEARABLE COMPUTER CASE AND WEARABLE COMPUTER

PRIORITY NOTICE

The present application claims priority under 35 U.S.C. § 119(e) to U.S. Provisional Patent Application Ser. No. 62/416,906 filed on Nov. 3, 2016, the disclosure of which is incorporated herein by reference in its entirety.

The present patent application is a continuation-in-part (CIP) of U.S. non-provisional patent application Ser. No. 29/583,304 filed on Nov. 3, 2016; wherein this present patent application claims priority to said U.S. non-provisional patent application under 35 U.S.C. § 120. The above-identified parent U.S. non-provisional patent application is incorporated herein by reference in their entirety as if fully set forth below

TECHNICAL FIELD OF THE INVENTION

The present invention relates in general to wearable computer cases and more specifically to wearable computer cases that may be worn as a backpack; wherein the wearable computer case may comprise one or more electrical components and one or more cooling means.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Presently (circa 2016) enjoying immersed VR (virtual reality) environments is gaining in popularity; whether for gaming or other purposes, such as training. Immersion into a given VR environment often entails a wearer wearing some sort of VR headset and VR computer hardware to process VR software. When the VR computer hardware is physically separated from the wearer of the VR headset, then VR headset and any other wearer controls may need to wireless communicate with the physically separated VR computer hardware and such a need for wireless communication may create some less than desirable limitations, such as distance limitations between the wearer and the physically separated VR computer hardware and potentially bandwidth communication limitations. The art has responded to these problems by instead not separating the VR computer hardware from the wearer. That is, the art has responded with several variations of wearable backpacks that house various VR computer hardware.

For example, there may be a Zotac VR PC (personal computer) backpack; which may be a largely fabric based traditional backpack that may house various computer components. The backpack may have a flexible mesh fabric panel for ventilation purposes. However, because of the flexible nature of the largely fabric based traditional backpack such housed computer components may be largely unprotected from bumping contact with the external environment and so any such housed computer components may need additional protective coverings to protect the housed computer components from undesirable bumping contact with the external environment. Additionally, the fabric nature of such a backpack may be prone to undesirable wear, ripping, and/or tearing over time. The housed computer components appear to secured to the backpack via VELCRO straps. Such securing of the housed computer components within such a flexible backpack with VELCRO straps, may be insufficient to minimize jostling and shifting of the computer components while the wearer moves around the environment.

Alienware appears to be providing a wearable VR PC product; whereas, in the Alienware product there is not so much a backpack but a PC with attached shoulder straps. This Alienware wearable VR PC product has very little ventilation holes. There appears to be some ventilation screens on the two opposing longitudinal sides; however, overall exterior surfaces of the product are generally solid surfaces with no ventilation holes. Overall the product may not have sufficient ventilation. This minimal ventilation may present a problem of hardware overheating which may in turn then limit this wearable VR PC to computer components with less than desirable computing power. When minimal ventilation is used, this may require a greater dependence upon power consuming cooling fans; which may be less desirable as use of such cooling fans may deplete charged batteries faster. Size wise, this Alienware wearable VR PC may be similar to mounting a large laptop computer with shoulder straps and wearing on ones back. Because of this size limitation, there may not be room for a sufficient large battery back within the wearable VR PC and so this wearable VR PC may be powered with external battery packs worn on the hips of the wearer.

Omen also appears to be providing a wearable VR PC product, somewhat similar functionally to the above noted Alienware wearable VR PC. This Omen VR PC product may have less ventilation than the Alienware wearable VR PC product and thus have a similar problem of being limited in using less than desirable computing power computer components.

MSI also appears to be providing wearable VR PC products, somewhat similar functionally to the above noted Alienware wearable VR PC and the Omen wearable VR PC product. MSI appears to have provided at least two different models. One model with more ventilation holes than seen in the Alienware and Omen products, with some ventilation holes on the two opposing longitudinal sides and with some ventilation holes on a front panel (i.e., opposing the panel closest to the wearer's back). However, even in this model, there may be insufficient ventilation. MSI's second model is more akin to the Alienware wearable VR PC, i.e., appears to only have some ventilation on the two opposing longitudinal sides in certain areas towards the top. Those two opposing longitudinal sides also appear to each house a removable battery, towards the bottom. In any event, this MSI second model appears to have less than desirable ventilation.

There is a need in the art for a wearable computer case; wherein the wearable computer case has rigid to semi-rigid exterior panels to help protect internal computer components from external bumping contacts with the environment and possibly to provide fixed mounting locations for such internal computer components; and wherein these exterior panels have sufficient ventilation to minimize dependence on case cooling fans.

It is to these ends that the present invention has been developed.

BRIEF SUMMARY OF THE INVENTION

To minimize the limitations in the prior art, and to minimize other limitations that will be apparent upon reading and understanding the present specification, the present invention describes an externally rigid to semi-rigid wearable computer case for housing various computer components. In some embodiments, the wearable computer case may comprise two different types of external sides: ventilated-sides and a non-ventilated side. In some embodiments, the wearable computer case may have four to five ventilated-sides. The ventilated-sides and the non-ventilated side together may form an enclosure for housing the various computer components. The ventilated-sides may comprise a plurality of ventilation-holes. In some embodiments, the plurality of ventilation-holes in a given ventilated-side may provide for a ratio of void space to non-void space (in terms of external surface area) that may be substantially from and including 0.6 to 0.4. In other embodiments, other ranges of such ratios may substantially from 0.8 to 0.4. Some embodiments may also provide for hot swap battery pack(s) that may be external to the wearable computer case and that may provide at least some electrical power to the various computer components housed within the wearable computer case. The wearable computer case and/or the hot swap battery pack(s) may be for virtual reality/augmented reality/mixed reality (VR/AR/MR, respectively) use.

It is an objective of the present invention to provide a wearable computer case with external panels that are rigid to semi-rigid.

It is another objective of the present invention to provide a wearable computer case with external panels that are rigid to semi-rigid in order to better protect computer components housed within the wearable computer case.

It is another objective of the present invention to provide a wearable computer case with external panels that are rigid to semi-rigid in order to provide fixed and strong points of attachment for computer components housed within the wearable computer case.

It is another objective of the present invention to provide a wearable computer case with external panels, wherein the external panels are comprised of ventilated-sides and a non-ventilated side.

It is another objective of the present invention to provide a wearable computer case with external panels, wherein the external panels are comprised of ventilated-sides and a non-ventilated side; wherein the ventilated-sides comprise four to five ventilated-sides.

It is another objective of the present invention to provide a wearable computer case with external panels, wherein the external panels are comprised of ventilated-sides and a non-ventilated side; wherein the ventilated-sides comprise a plurality of ventilation-holes.

It is another objective of the present invention to provide a wearable computer case with external panels, wherein the external panels are comprised of ventilated-sides and a non-ventilated side; wherein the ventilated-sides comprise a plurality of ventilation-holes; wherein there are sufficient ventilation-holes to minimize use of case cooling fans.

It is another objective of the present invention to provide a wearable computer case with external panels, wherein the external panels are comprised of ventilated-sides and a non-ventilated side; wherein the ventilated-sides comprise a plurality of ventilation-holes; wherein the ventilation-holes in a given ventilated-side may provide for a ratio of void space to non-void space (in terms of external surface area) that may be substantially from and including 0.6 to 0.4.

It is another objective of the present invention to provide a hot swap battery pack that may be used to electrically power at least some of computer components housed within a wearable computer case.

It is another objective of the present invention to provide a hot swap battery pack that may be used to electrically power at least some of computer components housed within a wearable computer case; wherein the hot swap battery pack may be swapped out for a fully charged hot swap battery pack with use of only one hand of a wearer of the wearable computer case.

It is another objective of the present invention to provide a hot swap battery pack that may be used to electrically power at least some of computer components housed within a wearable computer case; wherein the hot swap battery pack may be rendered in a VR/AR/MR environment to facilitate swapping and battery charge monitoring.

It is yet another objective of the present invention to provide a hot swap battery pack that may be used to electrically power at least some of computer components housed within a wearable computer case; wherein the hot swap battery pack may be comprise a chargingstatus-indicator to indicate a battery charge status of the hot swap battery pack.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

Figure 1:
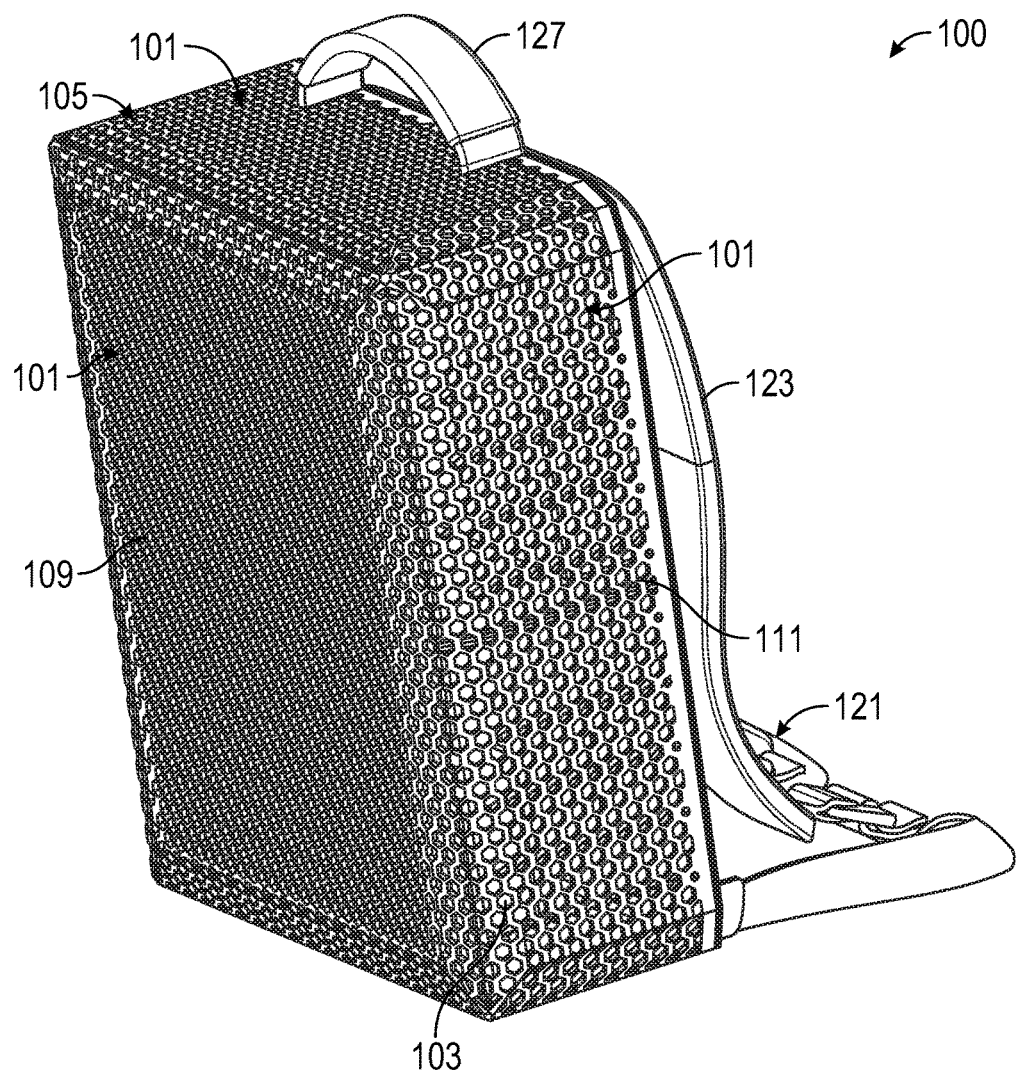
FIG. 1 may depict an embodiment of a wearable computer case, shown from a perspective view.

REFERENCE NUMERAL SCHEDULE 100 wearable computer case 100
101 ventilated-side 101
103 ventilation-holes 103
105 top-panel 105
109 front-panel 109
111 right-side-panel 111
121 harness system 121
123 shoulder strap 123
127 handle 127
207 bottom-panel 207
213 left-side-panel 213
215 non-ventilated side 215
220 baseplate 220
230 graphics card 230
231 graphics-card-air-guide 231
233 graphics-card-mounting-plateau 233
240 PSU 240
241 PSU-fan 241
242 battery pack 242
243 PSU-air-shield 243
250 motherboard 250
251 motherboard-air-shield 251
260 linkbox 260
409 structural-member 409
525 back-padding 525
703a pentagon shaped ventilation-hole 703a
703b heptagon shaped ventilation-hole 703b
703c octagon shaped ventilation-hole 703c
703d square shaped ventilation-hole 703d
703e diamond shaped ventilation-hole 703e
703f triangle ventilation-hole 703f
703g circle ventilation-hole 703g
703h oval ventilation-hole 703h
703i closed corner-less freeform shaped ventilation-hole 703i
800 hot swap battery pack 800
801 battery-pack-shell 801
811 bottom cover 811
815 positional-sensor 815
816 charging-status-indicator 816
821 battery-pack-holder 821
825 hook 825
826 press-button 826
829 battery-pack-holder-top-cover 829
903 battery-cell 903
905 battery-electrodes 905
907 connector-strip 907
909 connector-strip-holder 909
913 top cover 913
925 hook-receiver 925
927 fuse 927

DETAILED DESCRIPTION OF THE INVENTION

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

As used herein, VR may refer to "virtual reality"; AR may refer to "augmented reality"; and MR may refer to "mixed reality." And an embodiment or application for VR use may also be for AR or MR use, on other embodiments. That is, the embodiments contemplated herein may be for VR, AR, and/or MR uses.

FIG. 1 may depict an embodiment of a wearable computer case 100, shown from a perspective view. In some embodiments, external panels of wearable computer case 100 may be a substantially rigid to semi-rigid enclosure for housing computer components, such that when wearable computer case 100 may comprise the computer components, wearable computer case 100 may be a wearable computer. In some embodiments, such a wearable computer may be a wearable VR/AR/MR (virtual reality/augmented reality/mixed reality) PC (personal computer). (See e.g., FIG. 2, an exploded view, which may depict such various computer components that may be housed within wearable computer case 100.)

Continuing discussing FIG. 1, in some embodiments, the rigid to semi-rigid property of the external panels of wearable computer case 100 may be substantially formed from thermoformed plastics (e.g., via 3D printing, extrusion, stamping, and/or injection molding). In some embodiments, when the rigid to semi-rigid property of the external panels of wearable computer case 100 may be substantially formed from non-electrically conductive materials, substantially all of an interior of wearable computer case 100 may be lined with a fine metallic mesh to minimize uncontrolled RF (radio frequency) radiation entering or leaving wearable computer case 100. In some embodiments, such thermoformed plastics may comprise various fillers for additional properties, such as glass fibers for added structural strength; and/or metal fillers to minimize control of RF (radio frequency) radiation into and/or out of wearable computer case 100. In some embodiments, the rigid to semi-rigid property of the external panels of wearable computer case 100 may be substantially formed from one or more metals.

Continuing discussing FIG. 1, in some embodiments, wearable computer case 100 may be externally shaped as a substantially hollow three dimensional (3D) object, configured to house computer components. In some embodiments, this substantially hollow 3D object of wearable computer case 100 may be comprised of two different types of external sides: a ventilated-side 101 and a non-ventilated side 215. (See e.g., FIG. 2 for non-ventilated side 215). Continuing discussing FIG. 1, in some embodiments of wearable computer case 100, there may be more than one ventilated-side 101. In some embodiments, ventilated-side 101 may be comprised of a plurality of ventilation-holes 103. In some embodiments, plurality of ventilation-holes 103 may be a through hole, going entirely through a given ventilated-side 101, in order to provide ventilation (i.e., cooling) to the various computer components housed within wearable computer case 100.

Continuing discussing FIG. 1, in some embodiments, ventilated-side 101 may comprise five external sides: top-panel 105, bottom-panel 207, front-panel 109, right-side-panel 111, and left-side-panel 213. (Note, bottom-panel 207 and left-side-panel 213 may not be visible in FIG. 1, but may be visible in FIG. 2.) Continuing discussing FIG. 1, in some embodiments, top-panel 105 may be attached to front-panel 109, right-side-panel 111, left-side-panel 213, and to non-ventilated side 215. In some embodiments, front-panel 109 may be attached to top-panel 105, right-side-panel 111, left-side-panel 213, and bottom-panel 207. In some embodiments, right-side-panel 111 may be attached to front-panel 109, top-panel 105, bottom-panel 207, and to non-ventilated side 215. In some embodiments, a nature of attachment to such panels may be removable. In some embodiments, a nature of attachment to such panels may be permanent.

Continuing discussing FIG. 1, in some embodiments, top-panel 105, bottom-panel 207, front-panel 109, right-side-panel 111, and left-side-panel 213 may each comprise their own plurality of ventilation-holes 103. In some embodiments, where two different ventilated-sides 101 may attach to each other, at least some ventilation-holes 103 may be shared between the two different bottom cover 811. In some embodiments, along edges of where one given ventilated-sides 101 (e.g., front-panel 109) is in physical communication with another different ventilated-sides 101 (e.g., top-panel 105), there may be ventilation-holes 103 along such an edge.

Continuing discussing FIG. 1, in some embodiments, plurality of ventilation-holes 103 in a given ventilated-side 101 may provide for a ratio of void space to non-void space (in terms of external surface area). In some embodiments, this ratio of void space to non-void space may be from and including 0.6 to 0.4. In some embodiments, a given ventilated-side 101 may comprise a ratio of void space to non-void space of 0.6 to 0.4, including the range endpoints of 0.6 and 0.4 in various embodiments. In other embodiments, such ranges may be substantially from 0.8 to 0.4, including the endpoints of 0.8 and 0.4. In some embodiments, such ratios may minimize dependence upon case cooling fans. In some embodiments, such ratios may be optimal in providing both sufficient structural rigidity for wearable computer case 100 to function as a housing for the various computer components, while also allowing for ventilation of those various computer components. In some embodiments, ventilated-side 101, plurality of ventilation-holes 103, and/or these ratios, may facilitate ventilation via convection; i.e., as a given computer component housed within wearable computer case 100 generates heat, heated air proximate to such operating computer component may be less dense and rise, which may in turn allow for movement of cooler and more dense air to occupy volume left by the rising less dense hotter hair. Without proper ventilation, such convection is not possible. In some embodiments, ventilated-side 101, plurality of ventilation-holes 103, and/or these ratios, may facilitate ventilation via movements of the wearer; i.e., as the wearer of wearable computer case 100 moves around in an environment, air is forced into and through at least some of the plurality of ventilation-holes 103; which in turn may result in desired cooling of the various computer components housed within wearable computer case 100.

Continuing discussing FIG. 1, in some embodiments, wearable computer case 100 may comprise a means for removable attachment to the wearer. In some embodiments, this may be a harness system 121. In some embodiments, harness system 121 may comprise at least one shoulder strap 123. In some embodiments, harness system 121 may comprise a pair of shoulder straps 123. In some embodiments, any such shoulder strap(s) 123 may be adjustable. In some embodiments, harness system 121 may comprise at least one waist strap. In some embodiments, any such waist strap may be adjustable. In some embodiments, harness system 121 may comprise at least one handle 127. In some embodiments, shoulder strap 123 may be attached to non-ventilated side 215. In some embodiments, the waist strap may be attached to non-ventilated side 215. In some embodiments, handle 127 may be attached to non-ventilated side 215. In some embodiments, handle 127 may be attached to top-panel 105. In some embodiments, handle 127 may be attached to top-panel 105 and to non-ventilated side 215. In some embodiments, handle 127 may be attached to shoulder strap(s) 123. In some embodiments, shoulder strap 123 may be adjustable. In some embodiments, the waist strap may be adjustable. In some embodiments, shoulder strap 123 may be padded for wearer comfort. In some embodiments, the waist strap may be padded for wearer comfort. In some embodiments, handle 127 may be padded for wearer comfort. In some embodiments, harness system 121, shoulder strap 123, the waist strap, and/or handle 127 may be substantially constructed from flexible, thin, and elongate strapping and/or from flexible, thin, and elongate webbing, wherein such strapping and/or webbing may be synthetic (e.g., nylon) and/or natural (e.g., cotton, hemp, silk, leather, and the like).

In some embodiments, the wearer may be a human. In some embodiments, the wearer may be an animal. In some embodiments, the wearer may be a vehicle.

Figure 2:
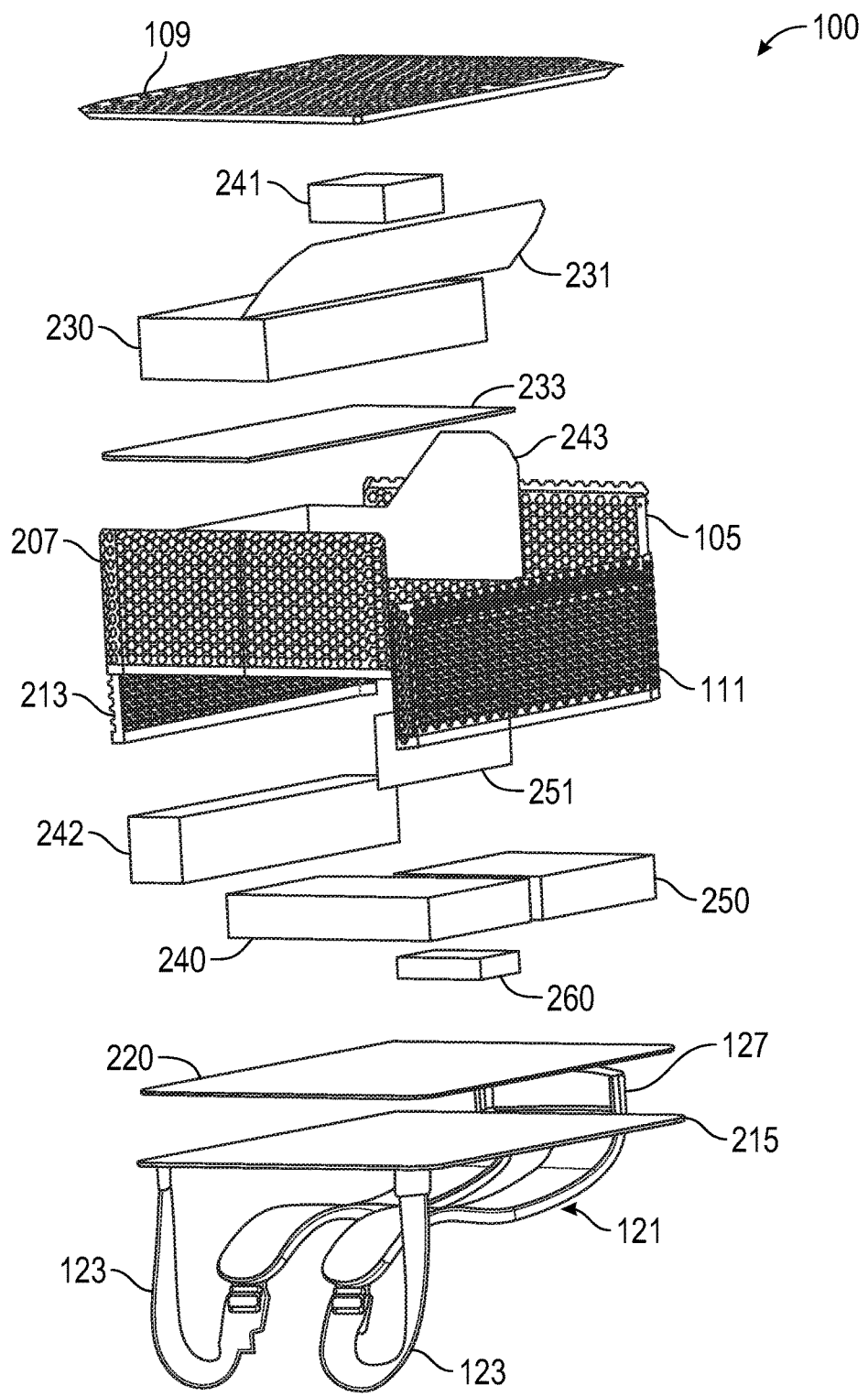
FIG. 2 may depict an exploded view of an embodiment of a wearable computer case, showing internal components, including computer components, shown from an exploded perspective view.

FIG. 2 may depict an exploded view of an embodiment of wearable computer case 100, showing internal components, including computer components, shown from an exploded perspective view.

Continuing discussing FIG. 2, in some embodiments, bottom-panel 207 may be attached to front-panel 109, right-side-panel 111, left-side-panel 213, and to non-ventilated side 215. In some embodiments, left-side-panel 213 may be attached to top-panel 105, front-panel 109, bottom-panel 207, and to non-ventilated side 215. In some embodiments, non-ventilated side 215 may be attached to top-panel 105, bottom-panel 207, right-side-panel 111, and to left-side-panel 213. In some embodiments, a nature of attachment to such panels may be removable. In some embodiments, a nature of attachment to such panels may be permanent.

In some embodiments, non-ventilated side 215 may have some holes, slots, and/or some ventilation holes; however, ventilated-sides 101 may have substantially more ventilation holes as compared against non-ventilated side 215.

Continuing discussing FIG. 2, in some embodiments, wearable computer case 100 internally may comprise various structures. In some embodiments, such structures may be for air guides (e.g., for guiding air movement); air shields (e.g., for blocking air and/or heat movement); mounting plateaus (e.g., for providing a mounting substrate); and/or a baseplate. In some embodiments, wearable computer case 100 may comprise one or more internal structures. In some embodiments, the one or more internal structures may comprise: graphics-card-air-guide 231, graphics-card-mounting-plateau 233, PSU-air-shield 243, motherboard-air-shield 251, and baseplate 220. (Note, PSU may stand for "power supply unit.")

Continuing discussing FIG. 2, in some embodiments, one or more of graphics-card-air-guide 231, graphics-card-mounting-plateau 233, PSU-air-shield 243, motherboard-air-shield 251, and/or baseplate 220 may be a substantially rigid structural member. In some embodiments, one or more of graphics-card-air-guide 231, graphics-card-mounting-plateau 233, PSU-air-shield 243, motherboard-air-shield 251, and/or baseplate 220 may be a substantially planar member. In some embodiments, one or more of graphics-card-air-guide 231, graphics-card-mounting-plateau 233, PSU-air-shield 243, motherboard-air-shield 251, and/or baseplate 220 may be a substantially flat member. In some embodiments, one or more of graphics-card-air-guide 231, graphics-card-mounting-plateau 233, PSU-air-shield 243, motherboard-air-shield 251, and/or baseplate 220 may be a substantially solid member. In some embodiments, one or more of graphics-card-air-guide 231, graphics-card-mounting-plateau 233, PSU-air-shield 243, motherboard-air-shield 251, and/or baseplate 220 may be a substantially constructed from a sheet of metal and/or from a sheet of plastic. In some embodiments, one or more of graphics-card-air-guide 231, graphics-card-mounting-plateau 233, PSU-air-shield 243, motherboard-air-shield 251, and/or baseplate 220 may comprise one or more hole for cabling passage (note, such structures may not be shown in FIG. 2, but are well understood in the art). In some embodiments, one or more of graphics-card-air-guide 231, graphics-card-mounting-plateau 233, PSU-air-shield 243, motherboard-air-shield 251, and/or baseplate 220 may comprise attachment and/or mounting structure for mounting to one or more of: a given ventilated-side 101, non-ventilated side 215, structural-member(s) 409, and/or to the various computer components (note, such structures may not be shown in FIG. 2, but are well understood in the art).

Continuing discussing FIG. 2, in some embodiments, the various computer components housed within wearable computer case 100 may comprise one or more of: graphics card 230; PSU (power supply unit) 240; PSU-fan 241 (for cooling the PSU 240); at least one battery pack 242; motherboard 250; linkbox 260; and/or a hard drive. In some embodiments, motherboard 250 may comprise one or more processors and memory for non-transitory storage of software and/or data; wherein such software may direct (control) the one or more processors. In some embodiments, linkbox 260 may comprise a network interface card, one or more radios for wireless communications, and/or one or more physical ports for connecting various cables. In some embodiments, each such a radio may comprise at least one antenna. For example, and without limiting the scope of the present invention, such physical ports may comprise one or more: USB ports, HDMI ports, AN (audio visual) ports, microphone port, speaker port, coaxial cable port, external power supply port, and/or the like. In some embodiments, portions of radio antennas may extend beyond external surfaces of ventilated-side 101 and/or of non-ventilated side 215. In some embodiments, the one or more physical ports may be accessible via openings in ventilated-side 101 (e.g., in top-panel 105) and/or in non-ventilated side 215.

Continuing discussing FIG. 2, in some embodiments, the various computer components may be in electrical and/or optical communication with each other. In some embodiments, battery pack 242 may provide electrical power to the various computer components. In some embodiments, PSU 240 may manage, control, and/or condition electrical power provided by battery pack 242. In some embodiments, PSU 240 may be a DC (direct current) power supply unit. In some embodiments, PSU-fan 241 may be an electrically powered fan that may provide active air flow towards PSU 240. Note, in some embodiments, PSU-fan 241 may be a fan to cool a specific computer component, such as PSU 240; but PSU-fan 241 may not be intended operate as a general fan to cool the computer components housed within wearable computer case 100. In some embodiments, graphics card 230 may be a graphics card that may be in electrical and/or optical communication with motherboard 250. In some embodiments, graphics card 230 may process and/or calculate at least some functions associated with graphics and/or video processing. In some embodiments, graphics card 230 may comprise its own graphics processor. In some embodiments, graphics card 230 may comprise its own memory. And in that graphics memory may be non-transitorily stored firmware for operating (controlling) that graphics processor(s) of graphics card 230.

Continuing discussing FIG. 2, in some embodiments, baseplate 220 may provide RF (radio frequency) radiation shielding between the wearer and the various computer components housed within wearable computer case 100. In some embodiments, baseplate 220 may be attached to non-ventilated side 215. In some embodiments, baseplate 220 and non-ventilated side 215 may be integral. In some embodiments, baseplate 220 and non-ventilated side 215 may be a same article of manufacture. In some embodiments, baseplate 220 may be a structural substrate for other structures (e.g., ventilated-side(s) 101, PSU-air-shield 243, and/or motherboard-air-shield 251) and/or for at least some of the various computer components to attach to.

Figure 3:
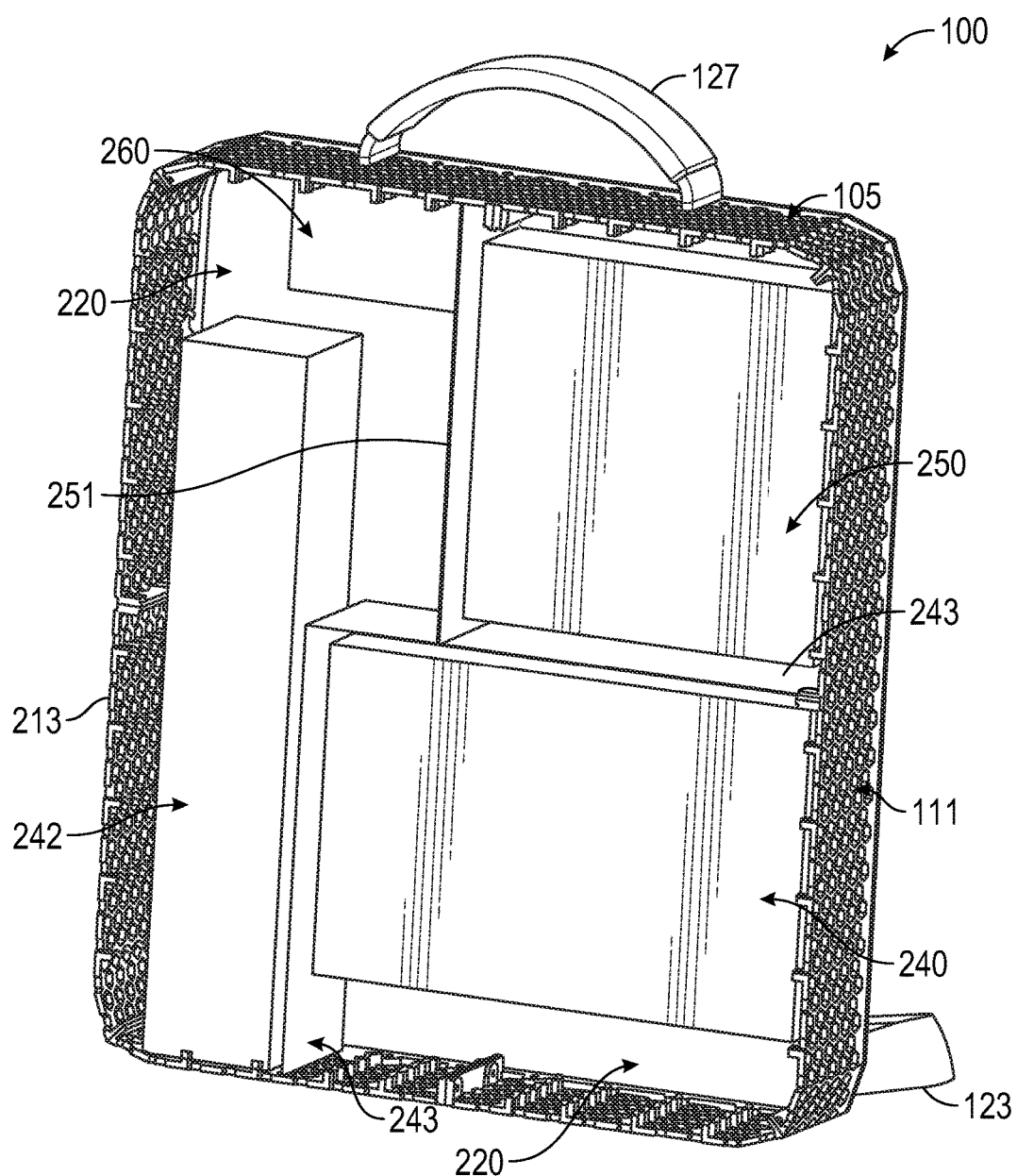
FIG. 3 may depict the wearable computer case from FIG. 1, shown from a cross-sectional view wherein about a front half of the wearable computer case may have been removed.

FIG. 3 may depict the wearable computer case 100, shown from a cross-sectional view wherein about a front half of the wearable computer case 100 may have been removed (including that of front-panel 109). Shown in FIG. 3, computer components of: motherboard 250, PSU 240, battery pack 242, and linkbox 260. Also shown in FIG. 3, may be at least portions of some internal structures, such as: baseplate 220, PSU-air-shield 243, and motherboard-air-shield 251. In some embodiments, at least a portion of PSU-air-shield 243 may be disposed between battery pack 242 and PSU 240. In some embodiments, at least a different portion of PSU-air-shield 243 may be disposed between motherboard 250 and PSU 240. In some embodiments, PSU-air-shield 243 may provide heat shielding between battery pack 242 and PSU 240. In some embodiments, at least a portion of motherboard-air-shield 251 may be disposed between motherboard 250 and battery pack 242. In some embodiments, motherboard-air-shield 251 may provide heat shielding between battery pack 242 and motherboard 250.

In some embodiments, linkbox 260 (or a substantial portion thereof) may be located proximate to top-panel 105 and/or proximate to non-ventilated side 215 and/or proximate to where top-panel 105 and non-ventilated side 215 meet. In some embodiments, such proximate distances may be three inches or less. In some embodiments, portions of linkbox 260 (e.g., antennas and/or ports) may protrude (extend) beyond external surfaces of top-panel 105 and/or of non-ventilated side 215 and/or of where top-panel 105 and non-ventilated side 215 meet. In some embodiments, where top-panel 105 and non-ventilated side 215 meet provide a recessed opening for ports and/or for antennas of linkbox 260. In some embodiments, linkbox 260 may comprise a on/off power button/switch for the computer components housed within wearable computer case 100. In some embodiments, linkbox 260 and/or an area immediately surrounding at least some portion of linkbox 260 may be configured to permit entry and exit of RF signals; wherein this area maybe RF insulated (shielded) from inside wearable computer case 100, but may be RF open to the environment outside of wearable computer case 100.

Figure 4:
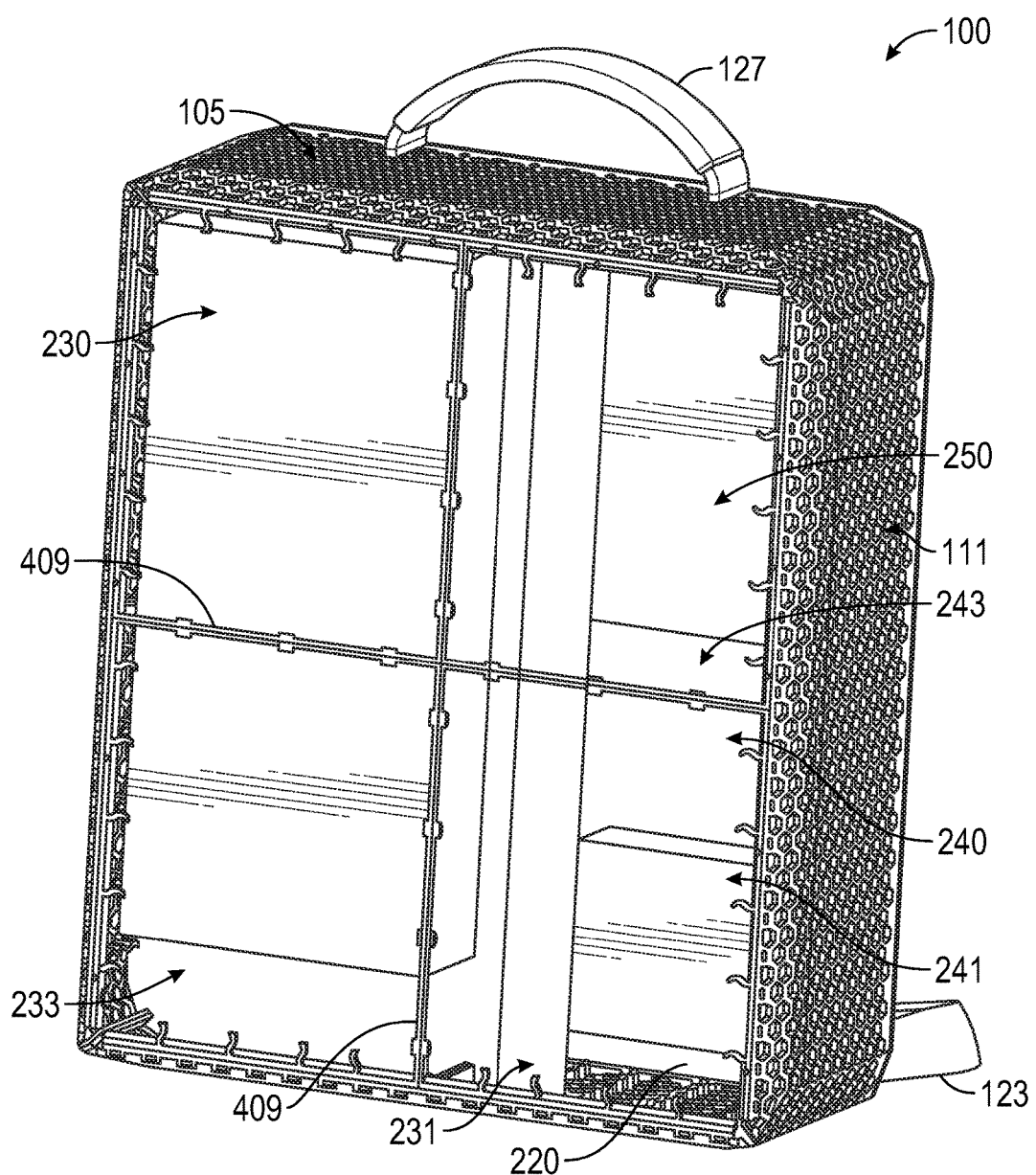
FIG. 4 may depict the wearable computer case from FIG. 1, shown from a cross-sectional view wherein a front panel of the wearable computer case may have been removed.

FIG. 4 may depict the wearable computer case 100, shown from a cross-sectional view wherein substantially all of front-panel 109 of wearable computer case 100 may have been removed. In some embodiments, structural-members 409 of front-panel 109 may still be shown in FIG. 4. In some embodiments, front-panel 109 may comprise at least one structural-member 409. In some embodiments, front-panel 109 may comprise at least two structural-members 409. In some embodiments, each structural-member 409 may be an elongate structural member, acting as a girder or truss in front-panel 109, providing additional structural strength to front-panel 109.

FIG. 4 may show graphics card 230, motherboard 250, PSU 240, and PSU-fan 241. Also shown in FIG. 4, may be portions of graphics-card-mounting-plateau 233 disposed beneath graphics card 230. In some embodiments, graphics card 230 may be attached to graphics-card-mounting-plateau 233. In some embodiments, graphics-card-mounting-plateau 233 may be attached to ventilated-side(s) 101. In some embodiments, graphics-card-mounting-plateau 233 may be disposed between graphics card 230 and battery pack 242. FIG. 4 may also depict graphics-card-air-guide 231. In some embodiments, graphics-card-air-guide 231 may run along an internal length of graphics card 230. In some embodiments, a portion of graphics-card-air-guide 231 may be disposed between graphics card 230 and PSU-fan 241. In some embodiments, a different portion of graphics-card-air-guide 231 may be disposed between graphics card 230 and motherboard 250.

Figure 5:
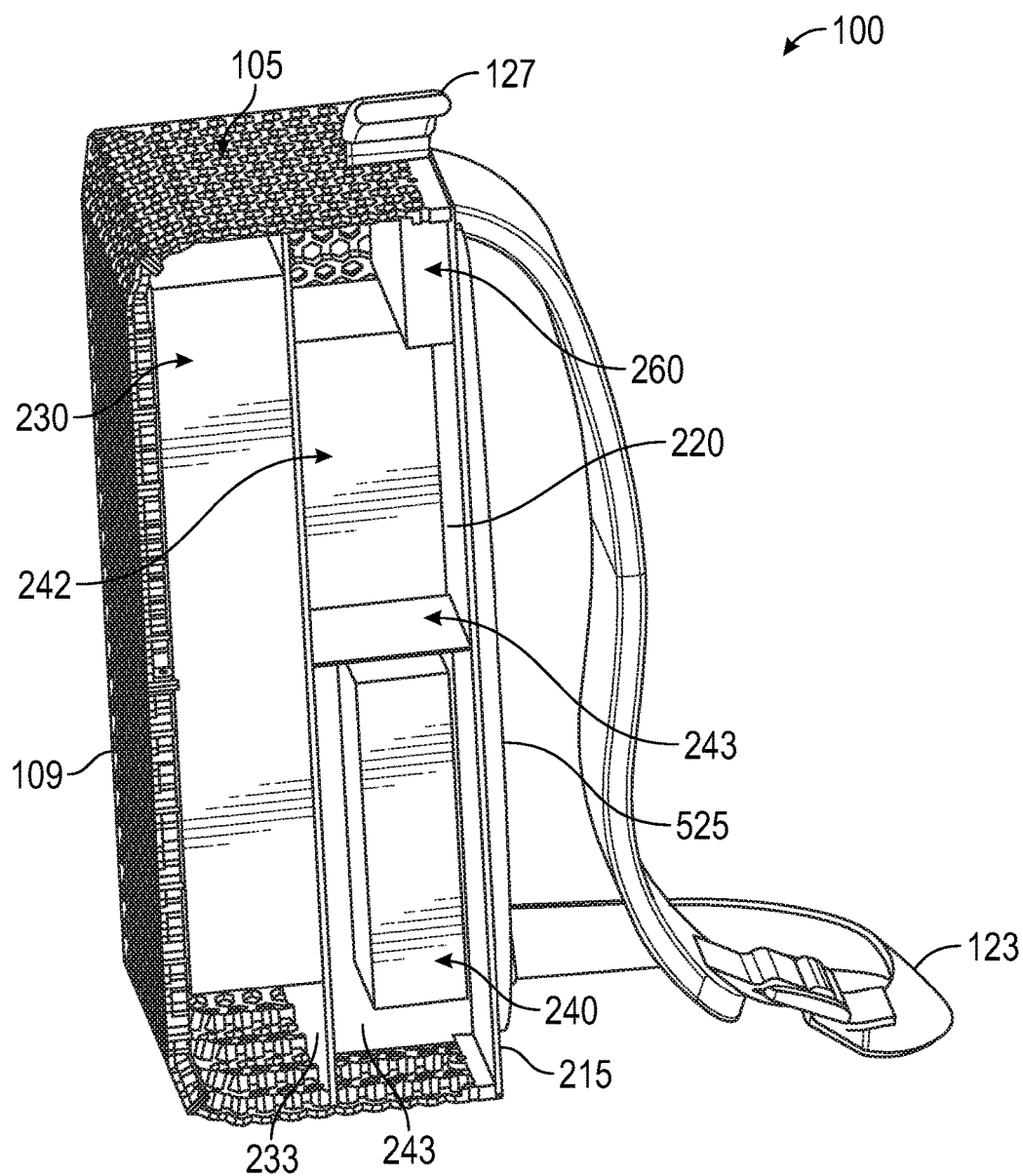
FIG. 5 may depict the wearable computer case from FIG. 1, shown from a cross-sectional view wherein about a left half of the wearable computer case may have been removed.

FIG. 5 may depict the wearable computer case 100, shown from a cross-sectional view wherein about a left half or more of the wearable computer case 100 may have been removed. FIG. 5 may show graphics card 230, PSU 240, battery pack 242, and linkbox 260. FIG. 5 may show PSU-air-shield 243 disposed between PSU 240 and battery pack 242. FIG. 5 may show graphics-card-mounting-plateau 233 disposed between PSU 240 and graphics card 230. FIG. 5 may also show baseplate 220 in communication with non-ventilated side 215. In some embodiments, linkbox 260 may be mounted to baseplate 220 and/or to top-panel 105.

Continuing discussing FIG. 5, in some embodiments, an exterior portion of non-ventilated side 215 may comprise back-padding 525. In some embodiments, exterior portions of back-padding 525 may removably contact portions of a back of the wearer, when wearable computer case 100 may be removably worn by the wear; e.g., worn as a backpack. In some embodiments, back-padding 525 may comprise padding; such as padding used in backpacks and/or as used in upholstery. In some embodiments, back-padding 525 may comprise foam. In some embodiments, back-padding 525 may comprise an elastomeric material.

Figure 6:
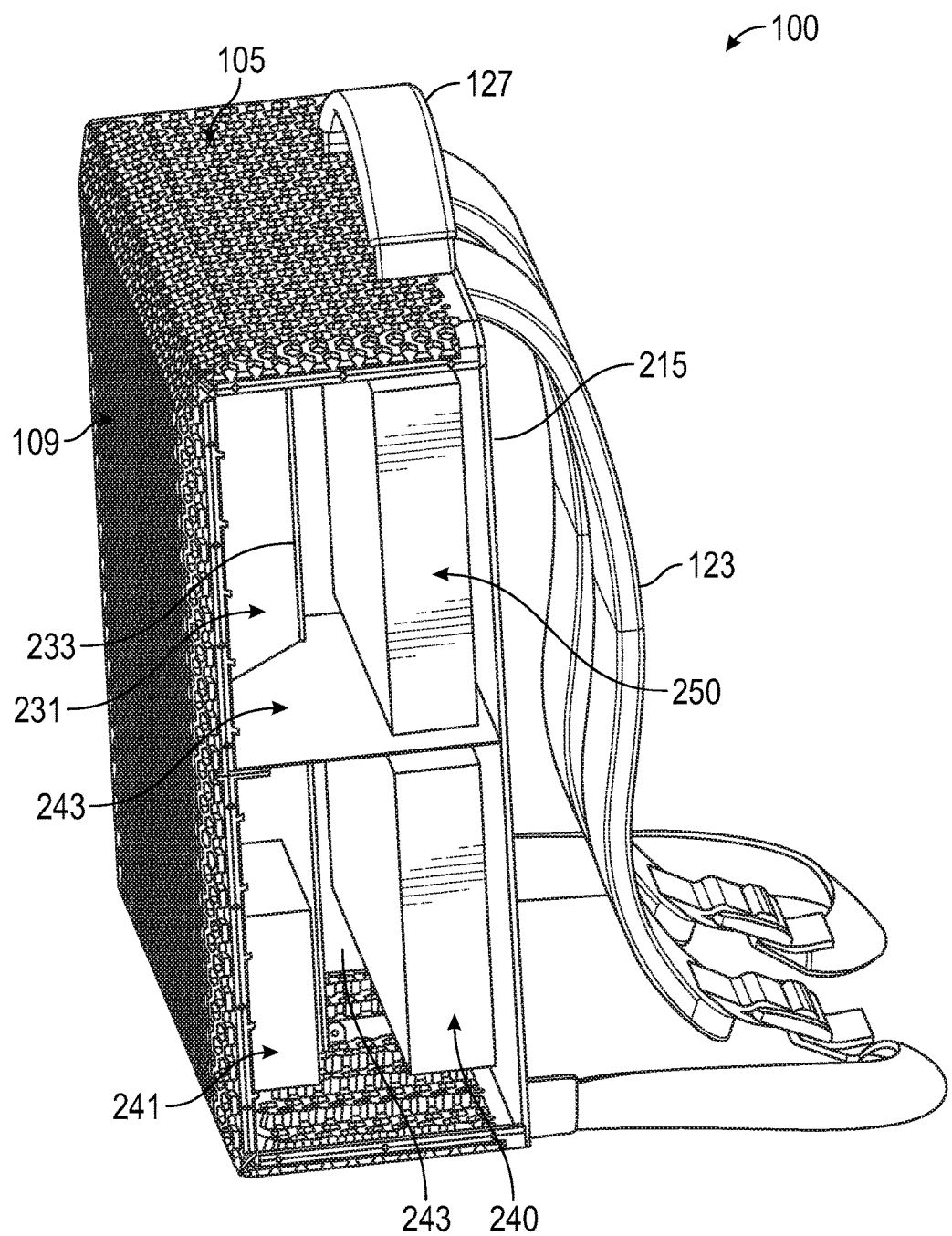
FIG. 6 may depict the wearable computer case from FIG. 1, shown from a cross-sectional view wherein a left panel of the wearable computer case may have been removed.

FIG. 6 may depict the wearable computer case 100, shown from a cross-sectional view wherein right-side-panel 111 of wearable computer case 100 may have been removed. In terms of computer components, FIG. 6 may show portions of: PSU 240, PSU-fan 241, and motherboard 250. FIG. 6 may show a longitudinal (length) edge of graphics-card-mounting-plateau 233. FIG. 6 may show portions of graphics-card-air-guide 231; wherein graphics card 230 may be disposed behind graphics-card-air-guide 231 and not shown in FIG. 6. FIG. 6 may show portions of motherboard-air-shield 251 disposed behind motherboard 250; wherein behind motherboard-air-shield 251 (and not shown in FIG. 6) may be portions of battery pack 242. FIG. 6 may show portions of PSU-air-shield 243 disposed between motherboard 250 and PSU 240.

Figure 7A:
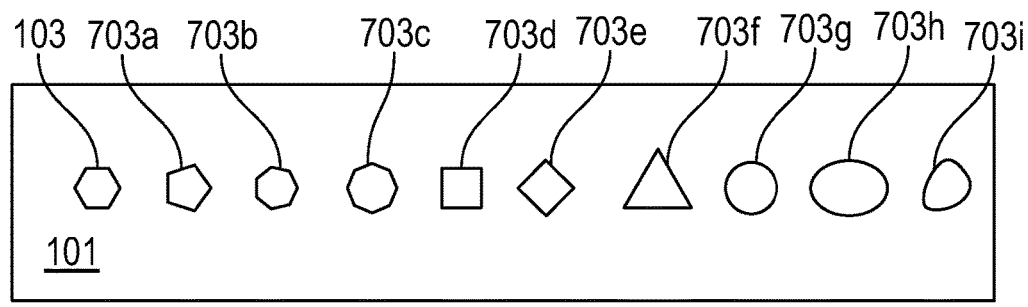
FIG. 7A may depict a front view of different shaped exterior ventilation holes.

FIG. 7A may depict a front view of different shaped exterior ventilation holes disposed in a section of ventilated-side 101. FIG. 7A may depict ventilation-hole 103, ventilation-hole 703a, ventilation-hole 703b, ventilation-hole 703c, ventilation-hole 703d, ventilation-hole 703e, ventilation-hole 703f, ventilation-hole 703g, ventilation-hole 703h, and ventilation-hole 703i. In some embodiments, such ventilation holes in a given ventilated-side 101 may comprise a two dimensional (2D) closed shaped projection when viewed from above (as in the front view of FIG. 7A) (or as viewed orthogonally from the given ventilated-side 101 with the given ventilation-holes 103 being viewed) selected from one or more of: a polygon, with or without rounded corners; a regular polygon, with or without rounded corners; an irregular polygon, with or without rounded corners; a hexagon, with or without rounded corners; a pentagon, with or without rounded corners; a heptagon, with or without rounded corners; an octagon, with or without rounded corners; a square, with or without rounded corners; a diamond, with or without rounded corners; a triangle, with or without rounded corners; a circle; an oval; a closed corner-less freeform shape, an ellipse; a trapezoid, with or without rounded corners; a star, with or without rounded corners; a rectangle, with or without rounded corners; a semi-circle; a half oval; a half ellipse; a silhouette of an animal; a silhouette of a logo; a silhouette of a flower; a silhouette of a plant; a silhouette of a tree; and/or the like.

Continuing discussing FIG. 7A, in some embodiments, ventilation-holes 103 may be a hexagon shaped ventilation hole. In some embodiments, ventilation-hole 703a may be a pentagon shaped ventilation hole. In some embodiments, ventilation-hole 703b may be a heptagon shaped ventilation hole. In some embodiments, ventilation-hole 703c may be an octagon shaped ventilation hole. In some embodiments, ventilation-hole 703d may be a square shaped ventilation hole. In some embodiments, ventilation-hole 703e may be a diamond shaped ventilation hole. In some embodiments, ventilation-hole 703f may be a triangle shaped ventilation hole. In some embodiments, ventilation-hole 703g may be a circle shaped ventilation hole. In some embodiments, ventilation-hole 703h may be an oval shaped ventilation hole. In some embodiments, ventilation-hole 703i may be a closed corner-less freeform shaped ventilation hole.

In some embodiments, a shape of ventilation holes (e.g., ventilation-hole 103, ventilation-hole 703a, ventilation-hole 703b, ventilation-hole 703c, ventilation-hole 703d, ventilation-hole 703e, ventilation-hole 703f, ventilation-hole 703g, ventilation-hole 703h, or ventilation-hole 703i) in a given ventilated-side 101 may be all be a same shape. In some embodiments, a shape of ventilation holes (e.g., ventilation-hole 103, ventilation-hole 703a, ventilation-hole 703b, ventilation-hole 703c, ventilation-hole 703d, ventilation-hole 703e, ventilation-hole 703f, ventilation-hole 703g, ventilation-hole 703h, or ventilation-hole 703i) in a given ventilated-side 101 may be mostly (majority) be the same shape. In some embodiments, a shape of ventilation holes (e.g., ventilation-hole 103, ventilation-hole 703a, ventilation-hole 703b, ventilation-hole 703c, ventilation-hole 703d, ventilation-hole 703e, ventilation-hole 703f, ventilation-hole 703g, ventilation-hole 703h, and/or ventilation-hole 703i) in a given ventilated-side 101 may be a combination of different shapes.

Figure 7B:
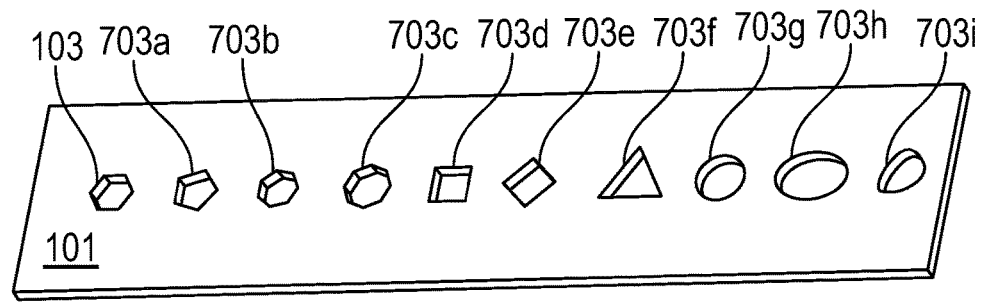
FIG. 7B may depict a perspective view of different shaped exterior ventilation holes.

FIG. 7B may depict a perspective view of different shaped exterior ventilation holes (e.g., ventilation-hole 103, ventilation-hole 703a, ventilation-hole 703b, ventilation-hole 703c, ventilation-hole 703d, ventilation-hole 703e, ventilation-hole 703f, ventilation-hole 703g, ventilation-hole 703h, and ventilation-hole 703i) disposed in a section of ventilated-side 101. FIG. 7B may show that such ventilation holes have a thickness characteristic of a thickness of the given ventilated-side 101. Thus, in some embodiments, such ventilation holes (e.g., ventilation-hole 103, ventilation-hole 703a, ventilation-hole 703b, ventilation-hole 703c, ventilation-hole 703d, ventilation-hole 703e, ventilation-hole 703f, ventilation-hole 703g, ventilation-hole 703h, and/or ventilation-hole 703i) may be through holes, to allow air movement. In some embodiments, such ventilation holes may also be skewed to reduce air resistance and further facilitate air movement into and out of wearable computer case 100.

Note the spacing of shown ventilation-holes in ventilated-side 101 shown in FIG. 7A and in FIG. 7B, is not intended to limited such spacing nor to limit patterns of such shown ventilation-hole. Rather, the ventilation-holes shown in ventilated-side 101 shown in FIG. 7A and in FIG. 7B, may be intended to demonstrate the ventilation-holes of various, but predetermined, shapes are expressly contemplated as aspects of various embodiments of the present invention.

Figure 8:
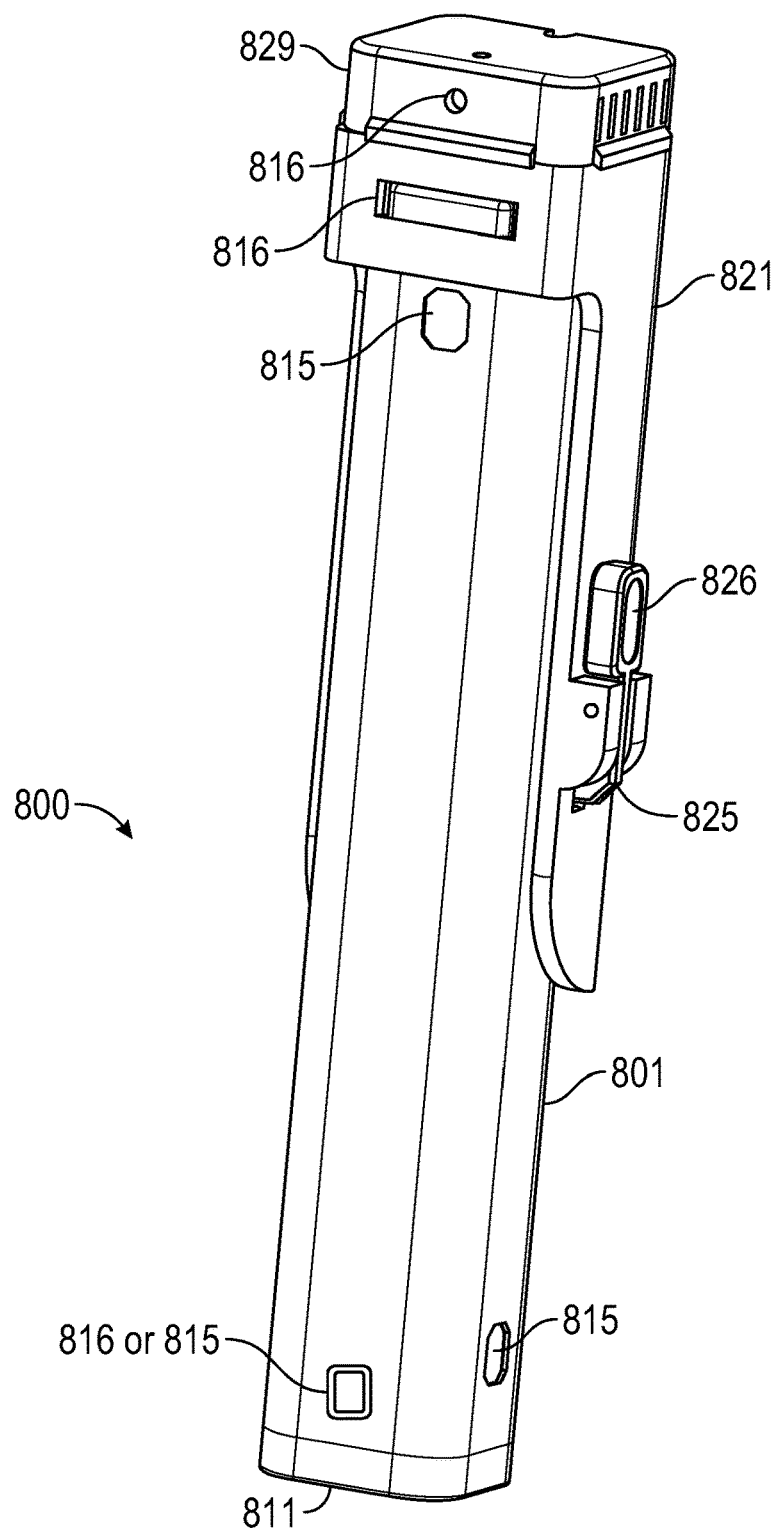
FIG. 8 may depict an embodiment of a battery pack, shown from a perspective view.
Figure 9:
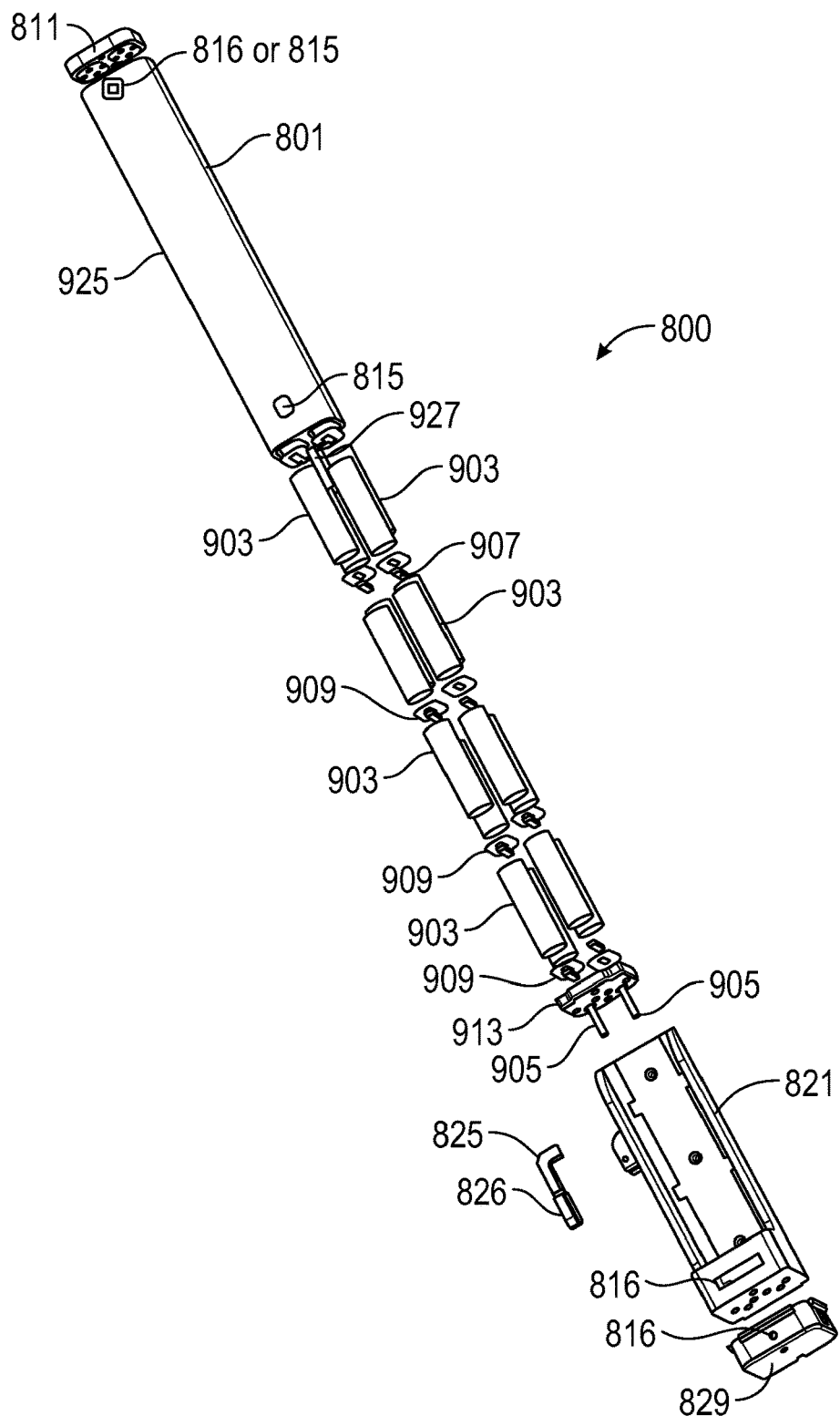
FIG. 9 may depict an exploded view of the battery pack of FIG. 8, shown from an exploded perspective view.

FIG. 8 may depict an embodiment of hot swap battery pack 800, shown from a perspective view and shown in its assembled configuration. FIG. 9 may depict an exploded view of hot swap battery pack 800, shown from an exploded perspective view. In some embodiments, hot swap battery pack 800 may provide at least some electrical power to computer components housed within wearable computer case 100. In some embodiments, hot swap battery pack 800 may be located externally to wearable computer case 100. In some embodiments, hot swap battery pack 800 may be removably attached to one or more of locations on the wearer, such as, but not limited to: chest, hips, upper legs, and/or the like. In some embodiments, the wearer may be wearing more than one hot swap battery pack 800. Via cabling, not shown, hot swap battery pack 800 may be in electrical communication with one or more computer components housed within wearable computer case 100. In some embodiments, a given hot swap battery pack 800 may comprise a battery-pack-shell 801 and at least one battery-cell 903. In some embodiments, a given hot swap battery pack 800 may comprise battery-pack-shell 801, at least one battery-cell 903, and battery-electrodes 905. In some embodiments, a given hot swap battery pack 800 may comprise battery-pack-shell 801, two or more battery-cells 903, a plurality of connector-strips 907, and battery-electrodes 905. In some embodiments, battery-cell 903 may be a rechargeable battery. In some embodiments, battery-cell 903 may be a lithium based battery. In some embodiments, battery-cell 903 may be a standard sized battery. For example and without limiting the scope of the present invention, battery-cell 903 may be size 18650. In some embodiments, a user (e.g., the wearer) may be able to swap out and/or replace and/or re-order battery-cells 903 within a given battery-pack-shell 801.

Continuing discussing FIG. 9, in some embodiments, for each battery-cell 903 there may be two connector-strips 907, with one such connector-strip 907 located at a positive end of battery-cell 903 and the other such connector-strip 907 located at the negative end of battery-cell 903. In some embodiments, a given connector-strip 907 may service more than one battery-cell 903. In some embodiments, a given connector-strip 907 may provide electrical communication between two different, but adjacent battery-cells 903. In some embodiments, each connector-strip 907 may be substantially constructed from one or more electrically conductive materials of construction (e.g., copper). In some embodiments, connector-strips 907 may provide for connecting battery-cells 903 in a parallel configuration. Paralleling battery-cells 903 may allow for higher currents to be drawn. In some embodiments, battery-cells 903 (and connector-strips 907) may be arranged in "8S2P" configuration; i.e., of 8 battery-cells 903 in series, 2 in parallel. In some embodiments, fuse 927 may electrically connect such columns of battery-cells 903 to each other. In some embodiments, fuse 927 when in use may be located (housed) within battery-pack-shell 801. In some embodiments, fuse 927 when in use may be located (housed) within battery-pack-shell 801 proximate to bottom cover 811; wherein, in some embodiments this proximate distance may be three inches or less. In some embodiments, a given connector-strip 907 may physically touch two different battery-cells 903 at the same time, wherein where connector-strip 907 touches each such battery-cell 903, connector-strip 907 may be thicker than other regions of connector-strip 907. For example, and without limiting the scope of the present invention, in some embodiments, such thickness may be about 0.5 mm (plus or minus 0.1 mm). Thus by using such connector-strips 907, a wider diversity of battery-cells 903 from diverse manufacturers may be utilized. In some embodiments, use of connector-strips 907 may also provide for rebalancing of battery-cells 903, which would not be possible if battery-cells 903 were permanently connected to each other.

Continuing discussing FIG. 9, in some embodiments, each connector-strip 907 there maybe one connector-strip-holder 909. In some embodiments, a given connector-strip-holder 909 may hold a given connector-strip 907.

Continuing discussing FIG. 9, in some embodiments, battery-electrodes 905 may comprise a pair of electrodes, i.e., a positive electrode and a negative electrode. In some embodiments, battery-electrodes 905 may provide for electrical communication between the at least one battery-cell 903 (or the two or more battery-cells 903) and other computer components, such as PSU 240. In some embodiments, battery-electrodes 905 may provide for electrical communication with terminally located connector-strip(s) 907.

Continuing discussing FIG. 9, in some embodiments, battery-pack-shell 801 may house one or more of: battery-cell 903, connector-strip 907, and/or connector-strip-holder 909. In some embodiments, battery-pack-shell 801 may removably house one or more of: battery-cell 903, connector-strip 907, and/or connector-strip-holder 909. In some embodiments, battery-pack-shell 801 may be a substantially hollow elongate container. In some embodiments, battery-pack-shell 801 may comprise bottom cover 811. In some embodiments, bottom cover 811 may cap or close off one terminal end of battery-pack-shell 801. In some embodiments, battery-pack-shell 801 may comprise top cover 913. In some embodiments, top cover 913 may cap or close off a remaining terminal end of battery-pack-shell 801. In some embodiments, battery-electrodes 905 may be in communication with top cover 913. In some embodiments, portions of battery-electrodes 905 may protrude (extend) externally from top cover 913.

Continuing discussing FIG. 9, in some embodiments, a given hot swap battery pack 800 may be removably received in a battery-pack-holder 821. In some embodiments, battery-pack-holder 821 may removably house at least a portion of hot swap battery pack 800. In some embodiments, 821 may comprise a hook 825. In some embodiments, an exterior of battery-pack-shell 801 may comprise hook-receiver 925. In some embodiments, hook-receiver 925 may be removably engaged by hook 825. For example, and without limiting the scope of the present invention, in some embodiments, hook-receiver 925 may be an indentation in battery-pack-shell 801. In some embodiments, hook 825 may further comprise a spring, such that hook 825 is spring loaded and design to removably engage hook-receiver 925 unless an opposing end of hook 825 is pressed to release hook 825 from hook-receiver 925. In some embodiments, this opposing end of hook 825 may be press-button 826. In some embodiments, the spring may be disposed between press-button 826 and an exterior side wall of battery-pack-holder 821. In some embodiments, each electrode of battery-electrodes 905 may be fitted with a spring. Such springs of battery-electrodes 905 may press against a battery-pack-holder-top-cover 829 of battery-back-holder 821, when hot swap battery pack 800 may be removably loaded into battery-back-holder 821 and when hook 825 may be removably engaging hook-receiver 925; such that, when press-button 826 of hook 825 is pressed to release hook 825 from hook-receiver 925 these springs of battery-electrodes 905 then push hot swap battery pack 800 away from battery-back-holder 821. Such mechanics may facilitate efficient, fast, and accurate swapping out of a depleted hot swap battery pack 800 for a freshly charged hot swap battery pack 800; which may be important to the wearer when using wearable computer case 100 for VR/AR/MR (virtual reality/augmented reality/mixed reality) engagement. In some embodiments, such hot swapping of hot swap battery pack 800 may also be done with only one hand of the wearer.

Continuing discussing FIG. 8 and FIG. 9, in some embodiments, a given battery-pack-shell 801 may comprise at least one positional-sensor 815. In some embodiments, such positional-sensor 815 may be located on an exterior of battery-pack-shell 801. Such positional-sensors 815 may be seen and/or read by VR/AR/MR hardware (e.g., special VR/AR/MR cameras [e.g., IR scanning cameras]) and then via VR/AR/MR software renders a VR/AR/MR model of hot swap battery pack 800 in VR/AR/MR, which may help to facilitate swapping out of hot swap battery pack 800 via the wearer. In some embodiments, such positional-sensor 815 may be reflective surfaces, configured to reflect certain wavelengths (e.g., IR [infrared]). In some embodiments, such positional-sensor 815 may emit certain wavelengths (e.g., IR). In some embodiments, such positional-sensor 815 may be LEDs (light emitting diodes); wherein such LEDs may emit certain wavelengths (e.g., IR). For example, and without limiting the scope of the present invention, in some embodiments, such positional-sensors 815 may be Lighthouse IR sensors, IR LEDs, QR codes, and/or the like.

Continuing discussing FIG. 8 and FIG. 9, in some embodiments, a given battery-pack-shell 801 may comprise at least one charging-status-indicator 816. In some embodiments, a given battery-pack-holder 821 may comprise at least one charging-status-indicator 816. In some embodiments, a given battery-pack-holder-top-cover 829 may comprise at least one charging-status-indicator 816. In some embodiments, charging-status-indicator 816 may be one or more LEDs and/or haptic feedback actuators (e.g., a rumble pack). In some embodiments, charging-status-indicator 816 may indicate a charging status of hot swap battery pack 800; such as, fully charged, mostly depleted, partially charged, in-use, available, empty, and/or the like.

Note with respect to the materials of construction, it is not desired nor intended to thereby unnecessarily limit the present invention by reason of such disclosure.

A wearable computer case, a wearable computer, and hot swap battery packs have been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention. While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A wearable computer case for housing computer components; wherein the wearable computer case comprises:
   two different types of external sides, a plurality of ventilated-sides and a non-ventilated side that together form a three-dimensional hollow object;
      wherein a ventilated-side selected from the plurality of ventilated-sides, that is disposed opposite of the non-ventilated side, comprises at least one structural-member that is different from structures that form ventilation in the ventilated-side selected from the plurality of ventilated-sides, wherein this at least one structural-member is an elongate member that provides structural reinforcement to the ventilated-side selected from the plurality of ventilated-sides; and
   a harness system for removable attachment of the wearable computer case to a wearer of the wearable computer case; wherein the harness system is attached to at least portions of the non-ventilated side.

2. The wearable computer case according to claim 1, wherein the plurality of ventilated-sides and the non-ventilated side are each substantially rigid to substantially semi-rigid.

3. The wearable computer case according to claim 1, wherein the plurality of ventilated-sides comprise at least five main panels of: a top-panel, a bottom-panel, a front-panel, a right-side-panel, and a left-side-panel; wherein the top-panel is disposed opposite of the bottom-panel; wherein the front-panel is disposed opposite of the non-ventilated side; wherein the right-side-panel is disposed opposite of the left-side panel; wherein the front-panel is attached to the top-panel, to the right-side-panel, to the left-side-panel, and to the bottom-panel; and wherein the non-ventilated side is attached to the top-panel, to the right-side-panel, to the left-side-panel, and to the bottom-panel.

4. The wearable computer case according to claim 1, wherein each ventilated-side selected from the plurality of ventilated-sides comprises its own plurality of ventilation-holes; wherein a given ventilation-hole selected from the plurality of ventilation-holes is a through hole passing entirely through that ventilated-side selected from the plurality of ventilated-sides; wherein the plurality of ventilation-holes provide for air flow and convective cooling.

5. The wearable computer case according to claim 4, wherein each of the given ventilation-holes selected from the plurality of ventilation-holes has a shape selected from: a polygon, with or without rounded corners; a regular polygon, with or without rounded corners; an irregular polygon, with or without rounded corners; a hexagon, with or without rounded corners; a pentagon, with or without rounded corners; a heptagon, with or without rounded corners; an octagon, with or without rounded corners; a square, with or without rounded corners; a diamond, with or without rounded corners; a triangle, with or without rounded corners; a circle; an oval; a closed corner-less freeform shape, an ellipse; a trapezoid, with or without rounded corners; a star, with or without rounded corners; a rectangle, with or without rounded corners; a semi-circle; a half oval; a half ellipse; a silhouette of an animal; a silhouette of a logo; a silhouette of a flower; a silhouette of a plant; or a silhouette of a tree.

6. The wearable computer case according to claim 4, wherein each of the given ventilation-holes selected from the plurality of ventilation-holes is substantially a same shape.

7. The wearable computer case according to claim 4, wherein a majority of the plurality of ventilation-holes from a given ventilated-side selected from the plurality of ventilated-sides are substantially a same shape.

8. The wearable computer case according to claim 4, wherein the plurality of ventilation-holes in a given ventilated-side selected from the plurality of ventilated-sides provides for a ratio of void space to non-void space of substantially from 0.8 to substantially 0.4, including endpoints.

9. The wearable computer case according to claim 1, wherein on an external surface of the non-ventilated-side comprises back-padding which is a region of cushioning.

10. The wearable computer case according to claim 1, wherein the harness system comprises at least one shoulder strap.

11. The wearable computer case according to claim 1, wherein the three-dimensional hollow object is substantially lined with a metallic mesh for minimizing unintended electromagnetic radiation with respect to substantial interiors of the wearable computer case.

12. The wearable computer case according to claim 1, wherein the wearable computer case further comprises one or more internal structures; wherein the one or more internal structures are selected from: a graphics-card-air-guide; a graphics-card-mounting-plateau; a PSU-air-shield; a motherboard-air-shield; or a baseplate.

13. The wearable computer case according to claim 12, wherein the one or more internal structures comprise one or more of the following properties: substantially rigid; substantially planar; substantially flat; substantially solid; made from a sheet of plastic; made from a sheet of metal; or have at least one hole for passage of wiring and cables.

14. The wearable computer case according to claim 12, wherein the graphics-card-air-guide substantially runs along an internal length of a graphics card; wherein a portion of the graphics-card-air-guide is disposed between the graphics card and a PSU-fan; wherein a different portion of the graphics-card-air-guide is disposed between the graphics card and a motherboard; wherein the graphics card, the PSU-fan, and the motherboard are selected from the computer components.

15. The wearable computer case according to claim 12, wherein a graphics card is attached to the graphics-card-mounting-plateau; wherein the graphics-card-mounting-plateau is a mounting substrate for the graphic card; wherein the graphics-card-mounting-plateau is attached to at least some of the plurality of ventilated-sides; wherein the graphics-card-mounting-plateau is disposed between the graphics card and a battery pack; and wherein the graphics-card-mounting-plateau is also between a power supply unit and the graphics card; wherein the graphics card, the battery pack, and the power supply unit are selected from the computer components.

16. The wearable computer case according to claim 12, wherein at least a portion of the PSU-air-shield is disposed between a battery pack and a power supply unit; wherein at least a different portion of the PSU-air-shield is disposed between a motherboard and the power supply unit; wherein the PSU-air-shield provides at least some heat shielding between the battery pack and the power supply unit; wherein the battery pack, the power supply unit, and the motherboard are selected from the computer components.

17. The wearable computer case according to claim 12, wherein at least a portion of motherboard-air-shield is disposed between a motherboard and a battery pack; wherein the motherboard-air-shield provides at least some heat shielding between the battery pack and the motherboard; wherein the motherboard and the battery back are selected from the computer components.

18. The wearable computer case according to claim 12, wherein the baseplate is located on an internal surface of the non-ventilated-side; wherein the baseplate provides at least some radio frequency radiation shielding from the computer components housed within the wearable computer case.

19. The wearable computer case according to claim 12, wherein the wearable computer case further comprises the computer components, wherein the computer components are selected from: a graphics card; a power supply unit; a PSU-fan; at least one battery pack; a motherboard; and a linkbox.

20. A wearable computer case for housing computer components; wherein the wearable computer case comprises:
 two different types of external sides, a plurality of ventilated-sides and a non-ventilated side that together form a three-dimensional hollow object;
 one or more internal structures within the three-dimensional hollow object; wherein the one or more internal structures are selected from: a graphics-card-air-guide; a graphics-card-mounting-plateau; a PSU-air-shield; a motherboard-air-shield; or a baseplate; and
 a harness system for removable attachment of the wearable computer case to a wearer of the wearable computer case; wherein the harness system is attached to at least portions of the non-ventilated side.

* * * * *